May 28, 1929.  L. R. DECAUX  1,715,057
LOUD SPEAKING DEVICE
Filed May 9, 1927
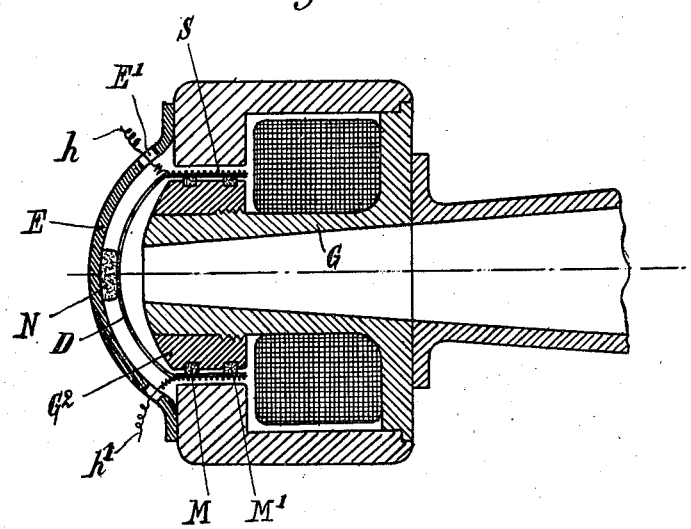

Patented May 28, 1929.

1,715,057

UNITED STATES PATENT OFFICE.

LEOPOLD RENÉ DECAUX, OF PARIS, FRANCE.

LOUD-SPEAKING DEVICE.

Application filed May 9, 1927, Serial No. 189,942, and in France May 22, 1926.

Loud-speaking devices are already known in which a solenoid or ring of the Fessenden type is placed in the air gap of an electromagnet. In such devices, the solenoid is maintained by elastic connecting members or by suitable bands.

The present invention relates to the substitution for the flexible members or the bands, of rings of a pile fabric or the like, such as velvet, plush or other material, which are disposed in the interior of the solenoid upon the central core of the electro-magnet and assure the centering of the said solenoid.

The following description with reference to the appended drawing, which is given by way of example, shows an embodiment of the present invention.

Fig. 1 shows in section a mode of realization of the invention.

This figure represents a loud-speaking device in which a solenoid S or ring of the Fessenden type is combined with a rigid diaphragm D, said solenoid S being placed in the air gap of an electromagnet G, and in conformity to the invention the solenoid S is supported by the rings M M¹, consisting of a pile substance, for instance of velvet or plush, which are disposed after the manner of packing rings in annular grooves formed on the periphery of the central core G. The fibres of the rings M M¹, will permit the vibrational displacement of the solenoid S, and will also form a tight joint between the cylindrical part of the movable element S and the corresponding part of the core G.

To provide for the ready replacing of the rings M M¹, the core G is provided with a removable head G², carrying the said rings. The head G² may be screwed to the core G properly so called, as shown in the figure, or may be secured thereto in any other suitable manner.

In accordance with the present invention, there is mounted on the cap E a spacing member N of flexible material such as felt, which serves to dampen the impact of the movable element S when the current is set up or ceases in the solenoid S. The cap E may be pierced with the apertures E¹ for the insertion of the input wire $h$ and the output wire $h^1$ of the solenoid, which may thus be attached to suitable binding posts.

Obviously, without departing from the principle of the present invention, it may be variously modified in detail.

What I claim is:

1. A loud-speaking device comprising a solenoid, said solenoid being movable in the air gap of an electromagnet, rings of a pile substance being disposed upon said electromagnet for centering the solenoid.

2. A loud-speaking device comprising a solenoid combined with a rigid diaphragm, an electromagnet, and rings of a pile substance which are disposed upon said electromagnet and make contact with the internal face of the solenoid whereby the latter is centered.

3. A loud-speaking device of the electromagnet type comprising a magnetic air gap, a solenoid disposed in said air gap, said solenoid being combined with a rigid diaphragm, rings of a pile substance disposed on the electromagnet and adapted to make contact with the internal face of the solenoid whereby the latter is centered and supported.

4. A loud-speaking device of the electromagnetic type comprising a magnetic air gap, a solenoid disposed in said air gap, said solenoid being combined with a rigid diaphragm, rings of a pile substance disposed on the electromagnet and adapted to make contact with the internal face of the solenoid whereby the latter is centered and supported, a cap covering the air gap and the rigid diaphragm, and elastic means for absorbing all shocks which may take place between the said rigid diaphragm and the said cap.

5. A loud-speaking device of the electromagnetic type comprising an electromagnet, a head secured thereto and forming with said electromagnet a cylindrical air gap, grooves being formed in the said separately secured head, rings of a pile substance disposed in said grooves, and a solenoid disposed in the air gap of said electromagnet and supported by the said rings of pile substance.

In testimony whereof I have signed this specification.

LEOPOLD RENÉ DECAUX.